UNITED STATES PATENT OFFICE.

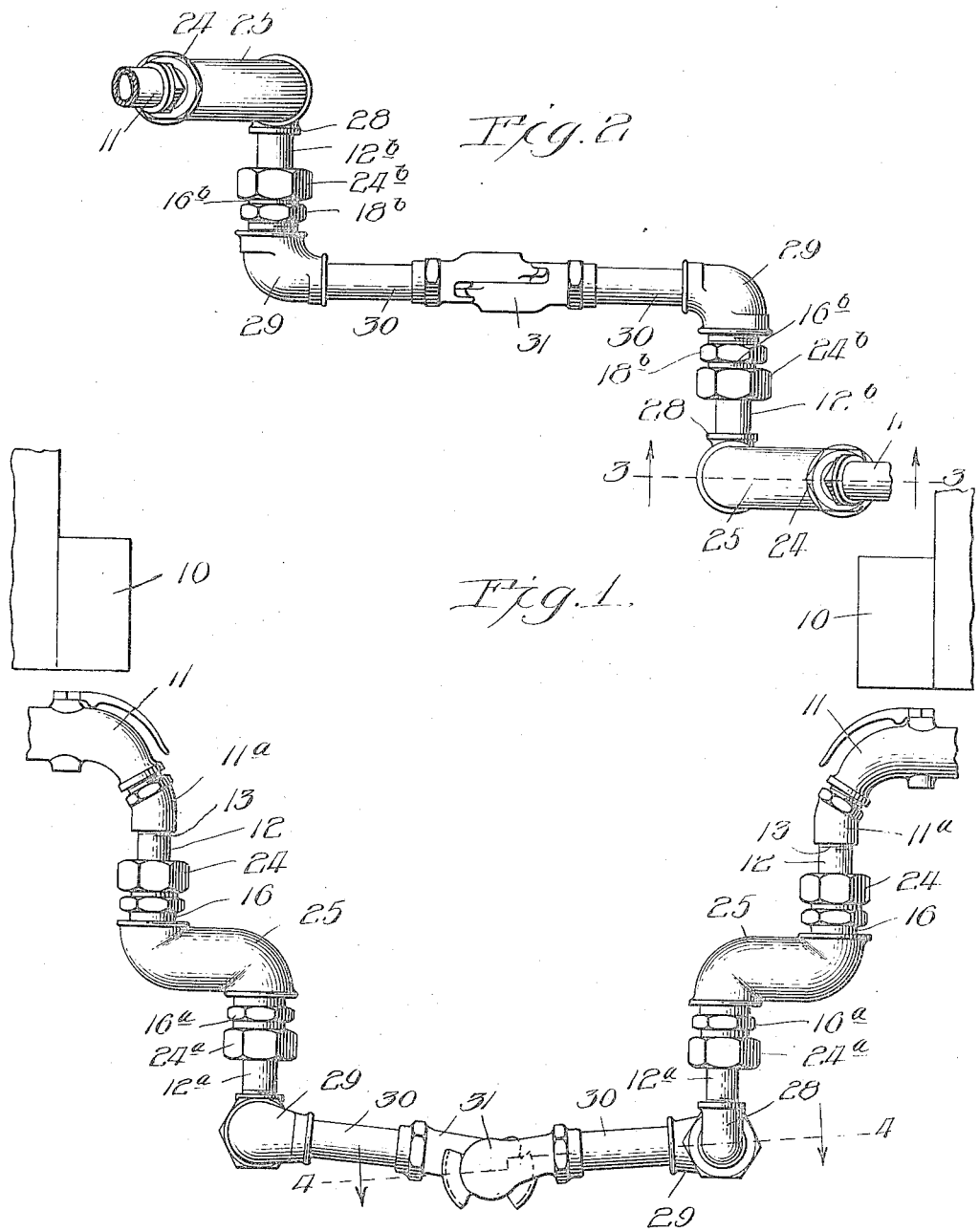

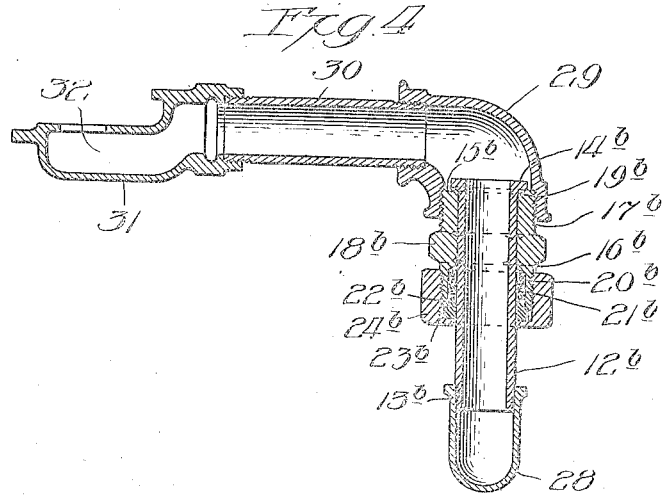
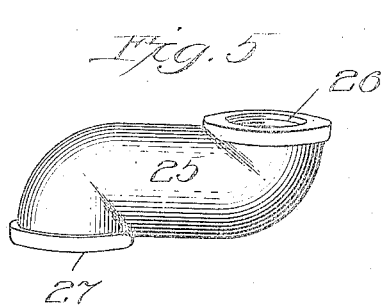
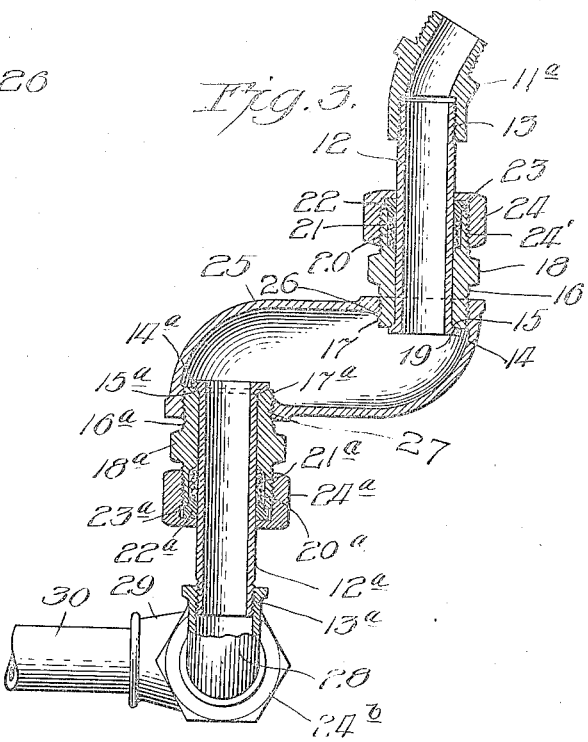

WILLIAM QUEENAN AND JOHN F. HANSEN, OF AURORA, ILLINOIS.

SWING-JOINT CONNECTION.

1,208,002.  Specification of Letters Patent.  Patented Dec. 12, 1916.

Application filed December 16, 1913. Serial No. 806,981.

*To all whom it may concern:*

Be it known that we, WILLIAM QUEENAN and JOHN F. HANSEN, citizens of the United States, residing at Aurora, in the county of Kane and State of Illinois, have invented certain new and useful Improvements in Swing-Joint Connections, of which the following is a specification.

This invention relates to improvements in swing joint connections, and has for its principal object to provide an improved passage for water, steam, compressed air or the like, between adjacent cars of a train or engine and tender or the like.

Prior to this time a rubber hose connection has been used almost exclusively in connecting the steam, water, and air pipes carried by adjacent cars, locomotives and the like and it has been found that such connections frequently burst under pressure and that the nipples and couplings blow out of the rubber, thereby delaying trains, causing serious accidents and resulting in a great waste, since the rubber connection when it becomes defective must be thrown away and sold for scrap.

The object of our invention is to provide a metallic connection with swing joints to insure flexibility, which will be a permanent connection and which will be capable of repairs.

A further object is to provide a metallic swing joint connection which possesses flexibility and which may be readily adjusted to a wide range of positions adjacent the end of a car.

Still another object is to provide an adaptable metallic connection which will be substantially free of leaks.

Our invention may comprise two separate and similar sets of connected swing joints, each set being connected at one end to and carried by the pipe line of a car or the like and provided at the other end with a suitable coupling by means of which the two sets are coupled together thereby forming a communication between the pipe lines of adjacent cars.

Referring to the drawings: Figure 1 shows a side elevation of our improved swing joint connection showing the pipe lines of two adjacent cars connected by means thereof; Fig. 2 shows a top plan view of the same; Fig. 3 shows a sectional view taken on line 3—3 of Fig. 2 looking in the direction of the arrows; Fig. 4 shows a sectional view taken along the line 4—4 of Fig. 1 looking in the direction of the arrows; Fig. 5 is a perspective view of the hollow connecting member.

Like numerals refer to like parts and elements in the several figures of the drawing, in which 10 designates generally the body of a railway car having a pipe line adapted to convey water, steam or the like through or beneath the car, said pipe line terminating in a valve 11 at the end of each car. Communicating with valve 11 by a suitable elbow 11$^a$, and depending downwardly therefrom, is a pipe section forming a duct member 12 externally threaded at 13 to engage said elbow and provided at its lower end with an external peripheral shoulder 14, having an upper beveled surface 15. Journaled upon the duct member 12 and carried thereby is a coupling sleeve 16 externally threaded at 17 and provided with a portion 18 adapted to be engaged by a wrench or the like. The coupling sleeve 16 is chamfered at its lower extremity to for ma surface 19 adapted to seat upon the surface 15 on said duct member and form a steam, air, and water-tight contact therewith. At the end opposite said surface 19, and surrounding the duct member 12, the coupling sleeve 16 is provided with a packing chamber 20 filled with a suitable packing material 21 and closed at its upper end by a packing gland 22 which is journaled upon the sleeve 12 and provided with an annular shoulder 23 adapted to seat upon the upper end of said coupling sleeve when the gland is in its lowermost position. Fitting over the gland 22 is a packing nut 24 apertured to pass over said duct member and internally threaded to engage the externally threaded portion 24' of the coupling sleeve 16. It will be obvious that by tightening the packing nut 24 on the coupling sleeve 16, the packing gland 22 will be forced downwardly into the chamber 20 thereby compressing the packing material 21 and preventing any leakage between the duct member 12 and the coupling sleeve 16 which revolves thereon. As above stated, leakage is further prevented by the surface 19 of the coupling sleeve seating closely upon the surface 15 of the duct member 12.

The hollow connecting member 25 has two threaded apertures 26 and 27 through bosses on opposite sides of said member and diagonally opposed to each other. By means of the threaded aperture 26 this connecting member engages the threaded portion 17 of the coupling sleeve 16, thereby forming a communication between the duct member 12 and a second duct member 12ª which is carried by and journaled in the coupling sleeve 16ª having an externally threaded portion 17ª engaging the threaded aperture 27 in said connecting member. The second duct member 12ª which is in all respects similar to the first duct member 12, is then offset from the duct member 12 while their axes are substantially parallel. It is obvious that the duct member 12ª is capable of rotation about its own axis within the coupling sleeve 16ª and that it is also capable of bodily rotation about the axis of duct member 12. The coupling sleeve 16ª is provided with a packing chamber 20ª, filled with packing material 21ª and closed by a packing gland 22ª and carries a packing nut 24ª. All of these parts are in all respects similar to the coupling sleeve and its parts carried by the first duct member 12.

The duct member 12ª is externally threaded at its lower end, as shown at 13ª to engage an elbow 28. The other end of this elbow threadedly engages the threaded portion 13ᵇ of the third duct member 12ᵇ which is disposed substantially at right angles to the second duct member 12ª. The duct member 12ᵇ is in all respects similar to duct members 12 and 12ª and it has journaled thereon a third coupling sleeve 16ᵇ which is provided with a packing chamber 20ᵇ, containing packing material 21ᵇ, closed by a packing gland 22ᵇ, and carries a packing nut 24ᵇ, all of these elements being in all respects similar to the previously described elements carried by the duct member 12.

The externally threaded portion 17ᵇ of the coupling sleeve 16ᵇ engages an elbow 29. The aperture at the other end of the elbow 29 threadedly engages a pipe section 30 which is disposed substantially at right angles to the duct member 12ᵇ. Threadedly engaging the pipe section 30 at the end opposite the elbow 29, is a coupling 31 having a duct 32 therethrough. This coupling 31 is adapted to connect with a corresponding coupling carried by the swing joint connector of an adjacent car, as shown in Figs. 1 and 2, thus forming a complete passage for water, steam, air or the like between the pipe lines of adjacent cars.

It will be apparent from the foregoing description that the coupling 31 carried by the pipe section 30 is capable of rotation in a vertical plane about the duct member 12ᵇ. It is also obvious that the coupling 31, together with the duct member 12ᵇ may both be revolved in a substantially horizontal plane about the axis of the member 12ª. It is further apparent that the duct member 12ª and all the parts carried thereby may be rotated bodily about the fixed duct member 12. These three similar joints, formed by the members 16, 16ª and 16ᵇ, capable of revolving on the duct members 12, 12ª and 12ᵇ respectively, make it possible to readily adjust the coupling 31 to lie in any plane and to occupy a wide range of positions adjacent the end of the car so that the coupling 31 may readily be brought into engagement with the corresponding coupling carried by the adjacent car.

We have thus described, in considerable detail, the essential features of a swing joint connection which is readily adjustable and capable of being repaired in case any of the parts become defective. It will be understood, however, that we do not limit ourselves to the particular details of construction herein shown, since our invention may be embodied in other structures of widely divergent form.

We claim:

1. In a device of the class described, a train pipe, a duct member secured to and depending downwardly from said pipe, said duct member being provided at its lower end with an external annular shoulder having an upper beveled surface, a coupling sleeve journaled on said duct member and having an inner annular inclined surface adapted to coact with said beveled surface on said duct member, a packing box formed within and carried by said coupling sleeve, a horizontally extending hollow connecting member having a threaded aperture in its upper side engaged by said coupling sleeve, said connecting member being provided on its lower side with a second threaded aperture diagonally disposed with reference to said first-named aperture, a second coupling sleeve threadedly engaging said second-named aperture and depending downwardly therefrom parallel to the longitudinal axis of said first-named coupling sleeve, said second-named coupling sleeve being provided at its upper extremity with an inner annular inclined surface, a second duct member journaled in said second-named coupling sleeve, said second-named duct member being provided at its upper end with an external annular shoulder having a bevel on its underside adapted to coact with said inclined surface on said second-named coupling sleeve, a second packing box formed within and carried by said second-named coupling sleeve, a third duct member extending horizontally from and fixed with respect to said second-named duct member, a third coupling sleeve journaled on said third-named duct member, said third-named duct member being provided at the extremity thereof opposite said second-named duct member with an annular beveled shoulder, said third-named coupling sleeve being provided with an inner inclined surface adapted to seat upon the beveled shoulder of said third-named duct member, a packing box formed within and carried by said third-named duct member, a pipe fixed with respect to said third-named coupling sleeve and communicating with said third-named duct member, and a coupling member carried by said last-named pipe.

2. In a swing joint connector, a downwardly extending duct member having an external peripheral shoulder at its lower end, a coupling sleeve seating upon said shoulder and journaled upon said duct member, a packing box formed within and carried by said coupling sleeve, said elements comprising a swing joint, a connecting member threadedly engaging said coupling sleeve, the principal axis of said connecting member lying at right angles to the principal axis of said duct member, a second duct member parallel to said first mentioned duct member, said second duct member being attached by means of a second coupling sleeve to said connecting member at the opposite end from and diagonally opposed to said first mentioned duct member, said second duct member being rigidly connected and angularly disposed with respect to the duct member of a third swing joint, the coupling sleeve of said last mentioned swing joint being connected to a coupling means, whereby said coupling means may be adjusted to lie in any plane and to occupy a wide range of positions.

3. In a device of the class described, a train pipe, a duct member secured to and depending downwardly from said pipe, said duct member being provided at its lower end with an external annular shoulder having an upper beveled surface, a coupling sleeve journaled on said duct member and having an inner annular inclined surface adapted to coact with said beveled surface on said duct member, a packing box formed within and carried by said coupling sleeve, a horizontally extending hollow connecting member having a threaded aperture in its upper side engaged by said coupling sleeve, said connecting member being provided on its lower side with a second threaded aperture diagonally disposed with reference to said first-named aperture, a second coupling sleeve threadedly engaging said second-named aperture and depending downwardly therefrom parallel to the longitudinal axis of said first-named coupling sleeve, said second-named coupling sleeve being provided at its upper extremity with an inner annular inclined surface, a second duct member journaled in said second-named coupling sleeve, said second-named duct member being provided at its upper end with an external annular shoulder having a bevel on its underside adapted to coact with said inclined surface on said second-named coupling sleeve, a second packing box formed within and carried by said second-named coupling sleeve, a third duct member connected to said second-named duct member, and a coupling member connected to said third duct member.

In testimony whereof, we have subscribed our names.

WILLIAM QUEENAN.
JOHN F. HANSEN.

Witnesses:
WALTER W. KOERFER,
CHARLES FARWELL.